US008284801B1

(12) United States Patent
Vashi et al.

(10) Patent No.: US 8,284,801 B1
(45) Date of Patent: Oct. 9, 2012

(54) METHOD AND APPARATUS FOR CONTROLLING AN OPERATING MODE FOR AN EMBEDDED ETHERNET MEDIA ACCESS CONTROLLER

(75) Inventors: Mehulkumar R. Vashi, San Jose, CA (US); Robert Yin, Castro Valley, CA (US); Jayant Mittal, San Jose, CA (US); Nicholas McKay, Edinburgh (GB); Julian Kain, Sunnyvale, CA (US); Martin B. Rhodes, Peebles (GB); Mark R. Nethercot, Peebles (GB)

(73) Assignee: Xilinx, Inc., San Jose, CA (US)

( * ) Notice: Subject to any disclaimer, the term of this patent is extended or adjusted under 35 U.S.C. 154(b) by 472 days.

(21) Appl. No.: 12/693,988

(22) Filed: Jan. 26, 2010

(51) Int. Cl.
*H04J 3/16* (2006.01)
(52) U.S. Cl. ......... 370/470; 370/252; 370/465; 370/471
(58) Field of Classification Search .................. 370/252, 370/65, 470, 471
See application file for complete search history.

(56) References Cited

U.S. PATENT DOCUMENTS

| 6,976,160 | B1 | 12/2005 | Yin et al. | |
|---|---|---|---|---|
| 7,248,587 | B1 * | 7/2007 | Sharma | 370/394 |
| 2004/0015617 | A1 * | 1/2004 | Sangha et al. | 710/10 |
| 2009/0193066 | A1 * | 7/2009 | Sato et al. | 708/651 |

OTHER PUBLICATIONS

IEEE, *IEEE Std 802.3-2005* Section One, Chapter 4, with special reference to Section 4.4.2, Dec. 12, 2005, pp. 55-91, IEEE, New York, New York, USA.
IEEE, *IEEE Std 802.3-2005* Section Two, Clause 31, with special reference to Section 31.4, Dec. 12, 2005, pp. 415-423, IEEE, New York, New York, USA.
Xilinx, Inc., *Virtex-5 FPGA Embedded Tri-Mode Ethernet MAC User Guide*, UG194 (v1.4), Mar. 31, 2008, pp. 1-218, Xilinx, Inc., San Jose, California, USA.

* cited by examiner

*Primary Examiner* — Hassan Kizou
*Assistant Examiner* — Ashil Farahmand
(74) *Attorney, Agent, or Firm* — Robert M. Brush; Lois D. Cartier

(57) ABSTRACT

Method and apparatus for controlling an operating mode of an Ethernet media access controller (MAC) embedded in a programmable device is described. In some examples, a configuration circuit is configured to receive a configuration signal from configuration memory of the programmable device and a host signal from a host bus of the programmable device, and configured to output a control length check disable signal the value of which depends on the value of at least one of the configuration signal or the host signal. A parameter check circuit is configured to receive a control signal derived from at least one of the control length check disable signal or the configuration signal, and configured to selectively disable checking a length of each control frame in frames received by the Ethernet MAC based on a value of the control signal.

17 Claims, 4 Drawing Sheets

METHOD AND APPARATUS FOR CONTROLLING AN OPERATING MODE FOR AN EMBEDDED ETHERNET MEDIA ACCESS CONTROLLER

FIELD OF THE INVENTION

One or more aspects of the present invention relate generally to an Ethernet media access controller (MAC) and, more particularly, to a method and apparatus for controlling an operating mode for an embedded Ethernet MAC.

BACKGROUND

Ethernet is a family of frame-based networking protocols commonly used to convey data between devices on local area networks (LANs). Ethernet is standardized in a collection of standards defined as IEEE 802.3. IEEE 802.3 specifies a media access control (MAC) sub-layer in the data link layer that defines different types of frames for flow control, such as control frames, pause frames, and the like. In particular, IEEE 802.3 defines the length of a control frame to be exactly 64 bytes, which is the minimum frame length of all frames. When the MAC logic in an Ethernet controller receives a control frame, the MAC logic checks the frame length. If the control frame is 64 bytes, the MAC logic signals the frame to be a good frame (unless other unrelated errors occur, such as an incorrect checksum). If the control frame is less than 64 bytes in length, the MAC logic signals the frame as a bad frame.

The restriction in IEEE 802.3 of the control frame length to exactly 64 bytes can result in inefficient operations from a systems perspective. For example, a user may want to concatenate several control commands in a proprietary format and encapsulate the control commands in a control frame. In such case, the length of the control commands may require the control frame to be longer than 64 bytes. Such a technique of command concatenation may increase efficiency because only a single control frame need be sent, rather than several control frames. However, conventional MAC logic complying with IEEE 802.3 will signal such a control frame as being bad, since the control frame will be longer than 64 bytes. Hence, the command concatenation scheme cannot be employed in cases where the hardware (e.g., MAC logic in the Ethernet controller) is strictly checking the length of a control frame against the 64 byte requirement of IEEE 802.3.

Accordingly, there exists a need in the art for controlling an operating mode for an embedded Ethernet MAC in order to overcome the aforementioned disadvantages.

SUMMARY

An aspect of the invention relates to an apparatus for controlling an operating mode of an Ethernet media access controller (MAC) embedded in a programmable device. In some embodiments, the apparatus includes: a configuration circuit configured to receive a configuration signal from configuration memory of the programmable device and a host signal from a host bus of the programmable device, and further configured to output a control length check disable signal the value of which depends on the value of at least one of the configuration signal or the host signal; and a parameter check circuit configured to receive a control signal derived from at least one of the control length check disable signal or the configuration signal, and further configured to selectively disable checking a length of each control frame in frames received by the Ethernet MAC based on a value of the control signal.

Another aspect of the invention relates to a method of controlling an operating mode of an Ethernet media access controller (MAC) embedded in a programmable device. In some embodiments, the method includes: receiving a configuration signal from configuration memory of the programmable device and a host signal from a host bus of the programmable device; generating a control length check disable signal the value of which depends on the value of at least one of the configuration signal or the host signal; deriving a control signal from at least one of the control length check disable signal or the configuration signal; and selectively disabling checking a length of each control frame in frames received by the Ethernet MAC based on a value of the control signal.

Another aspect of the invention relates to a programmable device. In some embodiments, the programmable device includes: an Ethernet media access controller (MAC) having a receive client interface for providing frames as output; a receive client circuit, coupled to the receive client interface, for processing the frames; a configuration memory having a storage location storing a value of a configuration signal coupled to the Ethernet media access controller; a host controller coupled to a host bus that provides a host signal to the Ethernet media access controller; a configuration circuit configured to receive the configuration signal and the host signal, and configured to output a control length check disable signal the value of which depends on the value of at least one of the configuration signal or the host signal; and a parameter check circuit configured to receive a control signal derived from at least one of the control length check disable signal or the configuration signal and to provide a frame length error signal to the receive client circuit, and configured to selectively disable checking a length of each control frame in the frames received by the Ethernet MAC based on a value of the control signal.

BRIEF DESCRIPTION OF THE DRAWINGS

Accompanying drawings show exemplary embodiments in accordance with one or more aspects of the invention. However, the accompanying drawings should not be taken to limit the invention to the embodiments shown, but are for explanation and understanding only.

DETAILED DESCRIPTION

Method and apparatus for controlling an operating mode for an embedded Ethernet MAC is described. In some embodiments, an Ethernet MAC embedded in a programmable device includes a configuration circuit that provides a signal for selectively disabling length checking of control frames (referred to as a "control length check disable signal"). The configuration circuit selectively sets the value of the control length check disable signal based on a value in configuration memory of the programmable device and a value received over a host bus of the programmable device. The control length check disable signal can be provided to a receive parameter check circuit that is configured to check the length of control frames received by the Ethernet MAC. The parameter check circuit selectively disables length checking based on the value of the control length check disable signal. In some embodiments, if a host bus is not used to interface with the configuration circuit, a configuration value in the configuration memory that controls length checking can be directly coupled to the parameter check circuit, which then selectively disables length checking of the control frames in response thereto.

Figure 1:
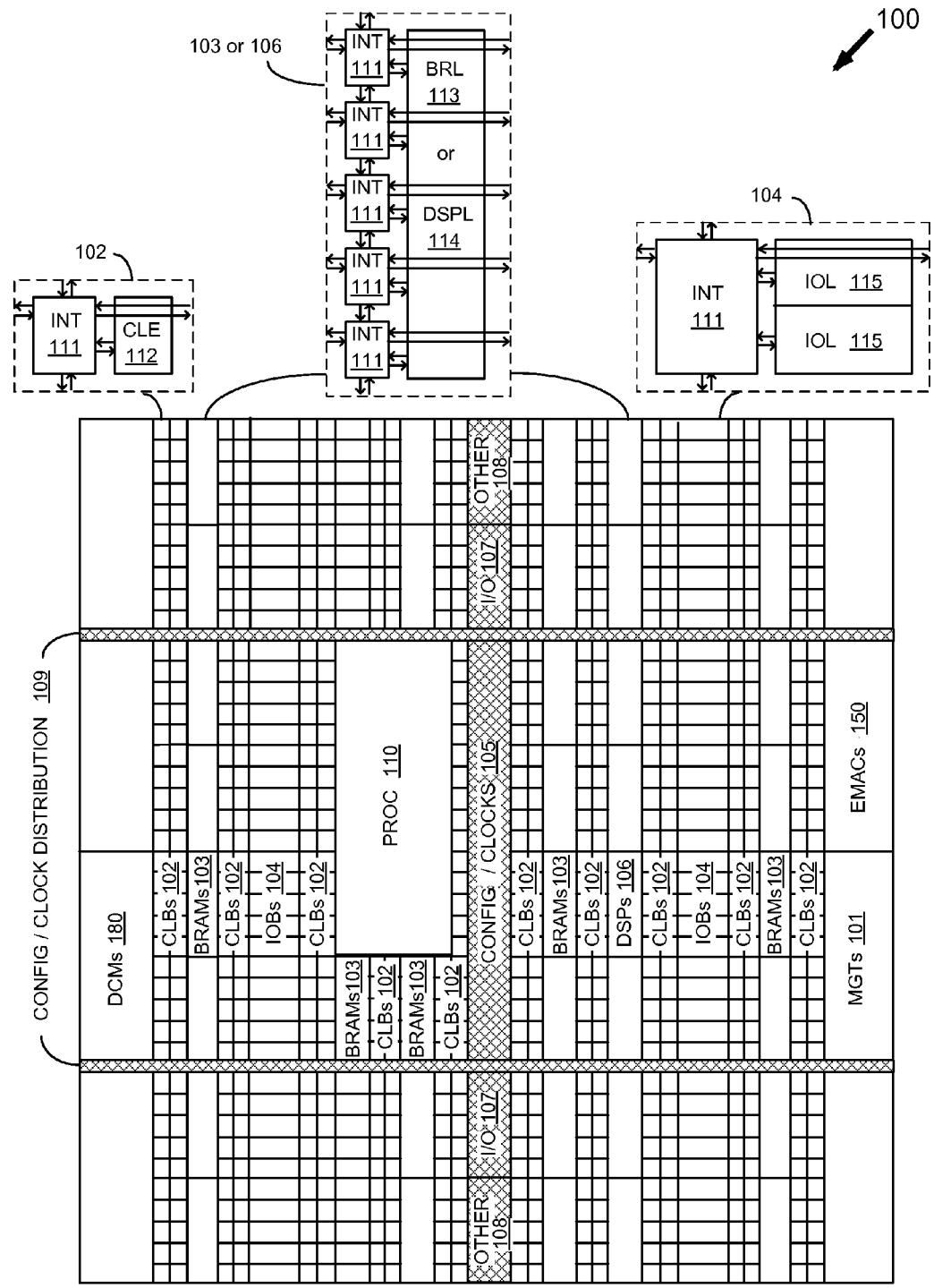
FIG. 1 illustrates an exemplary architecture for a programmable logic plane 100 of a field programmable gate array (FPGA)

FIG. 1 illustrates an exemplary architecture for a programmable logic plane 100 of an FPGA. The architecture 100 includes a large number of different programmable tiles including multi-gigabit transceivers (MGTs 101), configurable logic blocks (CLBs 102), random access memory blocks (BRAMs 103), input/output blocks (IOBs 104), configuration logic 116, clocking logic 117, digital signal processing blocks (DSPs 106), specialized input/output blocks (I/O 107) (e.g., configuration ports and clock ports), and other programmable blocks 108, such as digital clock managers, analog-to-digital converters, system monitoring logic, Ethernet media access controllers (EMACs) 150, and so forth. The layout of the physical structures implementing the programmable logic plane 100 on the IC may be the same or similar to the layout of the logical architecture shown in FIG. 1.

In some FPGAs, each programmable tile includes a programmable interconnect element (INT 111) having standardized connections to and from a corresponding interconnect element in each adjacent tile. Therefore, the programmable interconnect elements taken together implement the programmable interconnect structure for the illustrated FPGA. The programmable interconnect element (INT 111) also includes the connections to and from the programmable logic element within the same tile, as shown by the examples included at the top of FIG. 1. The programmable tiles and corresponding programmable interconnect structure are generally referred to as "programmable logic."

For example, a CLB 102 can include a configurable logic element (CLE 112) that can be programmed to implement user logic plus a single programmable interconnect element (INT 111). A BRAM 103 can include a BRAM logic element (BRL 113) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL 114) in addition to an appropriate number of programmable interconnect elements. An IOB 104 can include, for example, two instances of an input/output logic element (IOL 115) in addition to one instance of the programmable interconnect element (INT 111). As will be clear to those of skill in the art, the actual I/O pads connected, for example, to the I/O logic element 115 are manufactured using metal layered above the various illustrated logic blocks, and typically are not confined to the area of the input/output logic element 115.

The FPGA architecture 100 may also include one or more dedicated processor blocks (PROC 110). The processor block 110 comprises a microprocessor core, as well as associated control logic. The processor block 110 is coupled to the programmable logic of the FPGA in a well known manner.

In the pictured embodiment, a columnar area near the center of the die (shown hatched in FIG. 1) is used for configuration/clocking logic 105, the I/O logic 107, and the other control logic 108. Horizontal areas 109 extending from this column are used to distribute global clocks and configuration signals across the breadth of the FPGA. The configuration/clocking logic 105 provides an interface to, and loads configuration data to, a configuration memory (not shown).

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations as well as the location of the blocks within the array included at the top of FIG. 1 are purely exemplary. For example, in an actual FPGA more than one adjacent column of CLBs is typically included wherever the CLBs appear, to facilitate the efficient implementation of user logic.

Figure 2:
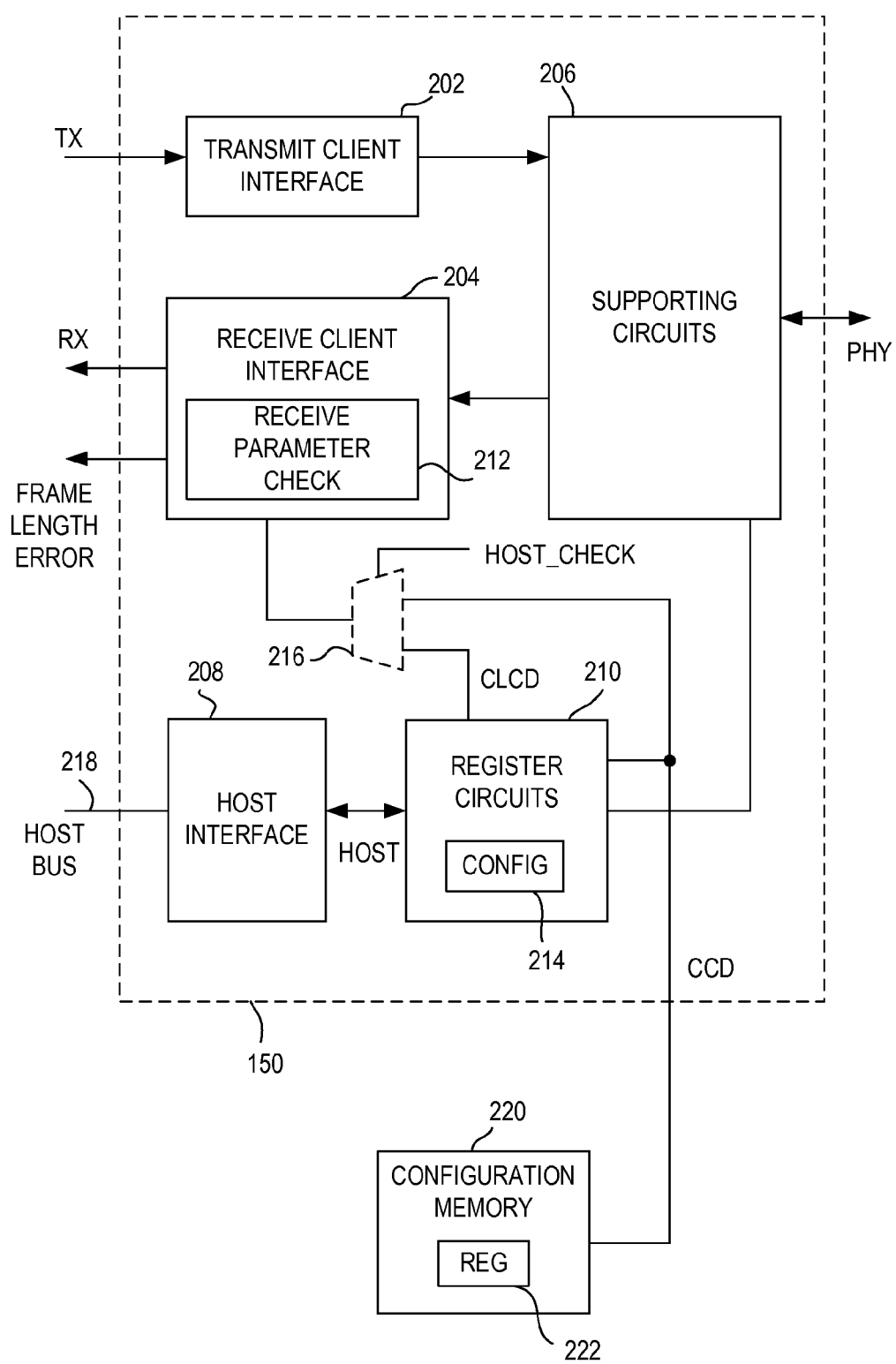
FIG. 2 is a block diagram depicting an Ethernet media access controller according to some embodiments of the invention.

FIG. 2 is a block diagram depicting an EMAC 150 according to some embodiments of the invention. The EMAC 150 includes a transmit client interface 202, a receive client interface 204, supporting circuits 206, a host interface 208, and register circuits 210. The receive client interface 204 includes a receive parameter check circuit 212. The register circuits 210 include a configuration circuit 214. In some embodiments, the EMAC 150 can optionally include a multiplexer 216.

The supporting circuits 206 is coupled to a physical Ethernet interface (PHY). The supporting circuits 206 can include various circuits for interfacing and receiving physical Ethernet signals, as well as other known circuits used in the transmission and reception of Ethernet signals. An input of the transmit client interface 202 is configured to receive data (TX) to be transmitted over a physical interface (PHY). An output of the transmit client interface 202 is coupled to an input of the supporting circuits 206. An input of the receive client interface 204 is coupled to an output of the supporting circuits 206 for receiving Ethernet frames from the PHY. An output of the receive client interface 204 is configured to output data (RX).

The host interface 208 is coupled to a host bus 218 of the FPGA 100. The host bus 218 may comprise one or more busses coupled to the processor 110, such as a generic host bus, a device control register (DCR) bus, and the like. The host interface 208 is further coupled to the register circuits 210. The register circuits 210 are further coupled to the supporting circuits 206 and configuration memory 220 of the FPGA 100 (through the configuration/clocking logic 105). Notably, the configuration memory 220 includes a register 222 for storing a value associated with the EMAC 150. The value is provided to the EMAC 150 as a client check disable (CCD) signal. In particular, the register circuits 210 are configured to receive the CCD signal from the configuration memory 220.

In operation, the configuration circuit 214 is configured to receive the CCD signal (generally a signal from the configuration memory or "configuration signal") and a signal from the host bus 218 via the host interface 208 (generally a "host signal"). The value of the CCD signal is set when the FPGA 100 is configured and programmed with a bitstream (or reprogrammed during dynamic reconfiguration). The value of the host signal from the host bus 218 can change dynamically at any time during operation. In particular, the host bus 218 may be a certain width, such as 32 bits wide. The host signal may be a one-bit signal on the host bus 218, such as the xth bit of the 32-bit bus.

The configuration circuit 214 is configured to output a control length check disable signal (CLOD signal). The value of the CLCD signal depends on the value(s) of the CCD signal and/or the host signal. For example, the CCD signal can be one value to disable length checking of the control frames, and another value to enable length checking of the control frames. The configuration circuit 214 can read the value of the CCD signal and set a control register (shown below) accordingly (i.e., checking enabled or disabled). In another example, the host signal can be one value to disable length checking of the control frames, and another value to enable length checking of the control frames. The configuration circuit 214 can read the value of the host signal and set a control register (shown below) accordingly. The configuration circuit 214 can also include logic for choosing which of the CCD signal and the host signal will be used to determine whether length checking of the control frames is enabled or disabled. An exemplary embodiment of the configuration circuit 214 is described below.

The parameter check circuit 212 is configured to check the length of control frames received by the receive client interface 204. As noted above, in IEEE 802.3, a control frame must be 64 bytes in length. In a first operation mode (e.g., an IEEE 802.3 operation mode), the parameter check circuit 212 can check the length of each control frame against the 64 byte requirement. If a control frame is not 64 bytes in length, the parameter check circuit 212 can assert a frame length error signal to indicate that a particular control frame has an invalid length.

In some embodiments, the parameter check circuit 212 receives the CLCD signal from the register circuits 210 (as generated by the configuration circuit 214). If the CLCD signal is one value, the first operation mode described above is invoked such that the parameter check circuit 212 checks the lengths of control frames against the 64 byte requirement. If the CLCD signal is another value indicating that length checking should be disabled, the parameter check circuit 212 disables checking the length of the control frames (second operation mode). In the second operational mode, the parameter check circuit 212 does not assert the frame length error signal if a given control frame is longer or shorter than the 64 byte requirement of IEEE 802.3.

In other embodiments, the CLCD signal from the register circuits 210 can be coupled to an input of the multiplexer 216. Another input of the multiplexer 216 can receive the CCD signal from the configuration memory 220. The multiplexer 216 can select either the CLCD signal or the CCD signal based on a value of a host check signal. The host check signal can be one value if the EMAC 150 is being used with a host controller on the host bus 218 (e.g., the processor 110), and another value if the EMAC 150 is not used with a host controller on the host bus 218. In cases where the EMAC 150 is used with a host controller, the multiplexer 216 selects the CLCD signal from the register circuits 210. In cases where the EMAC 150 is not being used with a host controller, the multiplexer 216 selects the CCD signal from the configuration memory 220.

Accordingly, the EMAC 150 includes two operational modes in which length checking of control frames is either performed or not performed. The operational mode of the EMAC 150 is selectable using configuration data in the configuration memory of the FPGA 100, data on a host bus of the FPGA 100, or both configuration data and host bus data. This allows the EMAC 150 to operate in compliance with IEEE 802.3, or in compliance with a proprietary network where control frames can include concatenated frames and thus be longer than 64 bytes in length.

Aspects of the invention have been described with respect to Ethernet and IEEE 802.3. It is to be understood that one or more aspects of the invention can be applied to network protocols in general. For example, a generic network protocol may have control frames which must be a certain length. The a MAC similar to the EMAC 150 can be configured to check or not check control frames of this generic network protocol against the required length in an identical manner (i.e., using signals from configuration memory, host bus, or both to select an operational mode). Furthermore, aspects of the invention have been described with respect to an EMAC 150 embedded in an FPGA 100. It is to be understood that the EMAC 150 can be embedded in other programmable devices, such as complex programmable logic devices (CPLDs).

Figure 3:
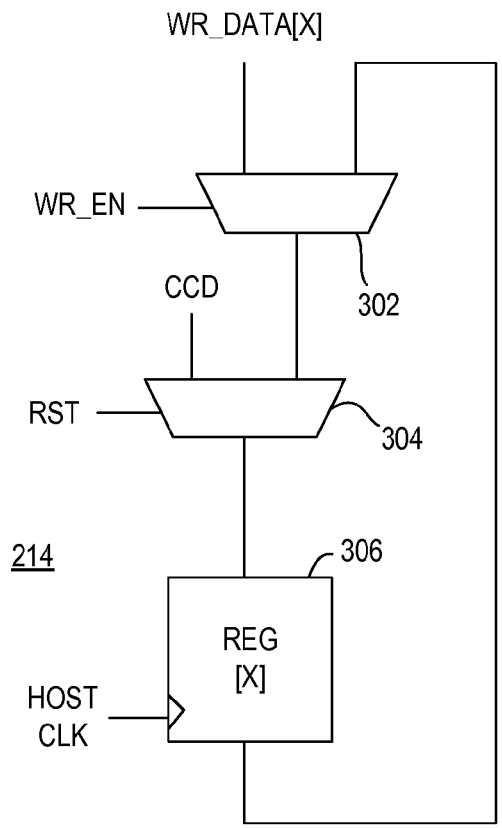
FIG. 3 is a block diagram depicting an exemplary embodiment of a configuration circuit in the Ethernet MAC of FIG. 2 according to some embodiments of the invention.

FIG. 3 is a block diagram depicting an exemplary embodiment of the configuration circuit 214 according to some embodiments of the invention. The configuration circuit 214 can include a multiplexer 302, a multiplexer 304, and a register 306. An input of the multiplexer 302 is configured to receive a signal from the host bus 218, referred to as WR_DATA[x]. For example, the host bus signal can be one bit (x) of a multi-bit bus. Another input of the multiplexer 302 is configured to receive an output of the register 306. A control input of the multiplexer 302 can receive a signal WR_EN. An output of the multiplexer 302 is coupled to an input of the multiplexer 304. Another input of the multiplexer 304 is configured to receive the CCD signal from the configuration memory 220. A control input of the multiplexer 304 can receive a signal RST. An output of the multiplexer 304 is coupled to an input of the register 306. The register 306 is configured to store a value based on a clock signal HOST_CLK. For example, the register 306 can be one bit of a multi-bit register, e.g., REG[x]. The output of the register 306 provides the CLCD signal from the register circuit 210.

In operation, if the RST signal is asserted, the register 306 loads the value of the CCD signal from the configuration memory 220 according to the HOST_CLK signal. The HOST_CLK signal can be a clock signal provided by the host bus 218. When the RST signal is de-asserted, the register 306 loads the value of the output of the multiplexer 302 according to the HOST_CLK signal. Thus, the multiplexer 304 selects the CCD signal or the output of the multiplexer 302 based on the assertion or de-assertion of the RST signal. The RST signal can be provided by the supporting circuits 206. In some embodiments, the RST signal can be a logical combination of reset signals. For example, the RST signal can be a logical combination of an asynchronous reset signal for the EMAC 150 (as provided by the FPGA 100) and a software reset signal provided through the host bus 218.

The multiplexer 302 selects either the WR_DATA[x] signal from the host bus 218 or the output of the register 306 according to the WR_EN signal. Thus, if the WR_EN signal is de-asserted and the RST signal is de-asserted, the register 306 maintains its value. If the WR_EN signal is asserted and the RST signal is de-asserted, the value of the WR_DATA[x] signal is loaded into the register 306 according to the HOST_CLK signal. Thus, the WR_EN signal controls whether the register is loaded with a value from the host bus 218. The WR_EN signal can be received from the supporting circuits 206 or from the host bus 218. In this manner, the CLCD signal for enabling or disabling control frame length checking is set using the configuration signal CCD, the host bus signal WR_DATA[x], or both such signals.

Figure 4:
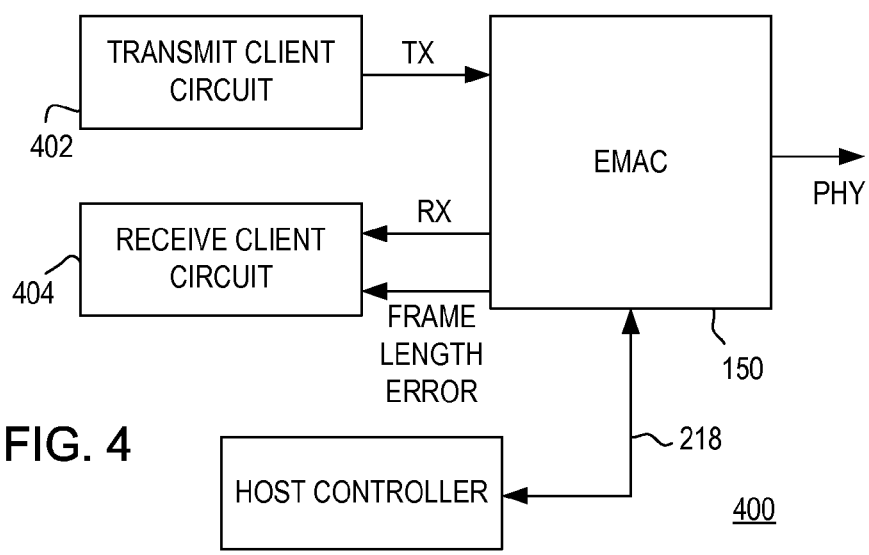
FIG. 4 is a block diagram depicting an exemplary embodiment of a network interface according to some embodiments of the invention.

FIG. 4 is a block diagram depicting an exemplary embodiment of a network interface 400 according to some embodiments of the invention. The network interface 400 includes the EMAC 150, a transmit client circuit 402, and a receive client circuit 404. The network interface 400 optionally includes a host controller 406. The transmit client circuit 402 provides the data TX, which is received by the transmit client interface 202 of the EMAC 150 as described above. The receive client circuit 404 receives the data RX, which is provided by the receive client interface 204 as described above. The host controller 406 can be coupled to the host bus 218, which is coupled to the host interface 208, as described above. The receive client circuit 404 is further configured to receive the frame length error signal from the EMAC 150 (as provided by the receive client interface 204). The receive client circuit 404 will properly process control frame data from the EMAC 150 regardless of whether the network is IEEE 802.3 or proprietary, since the EMAC 150 handles the selective disabling of control frame length checking. The EMAC 150 can be configured to check or not check the control frame length using the host controller 406 (if present) or through configuration of the FPGA 100, as noted above.

Figure 5:
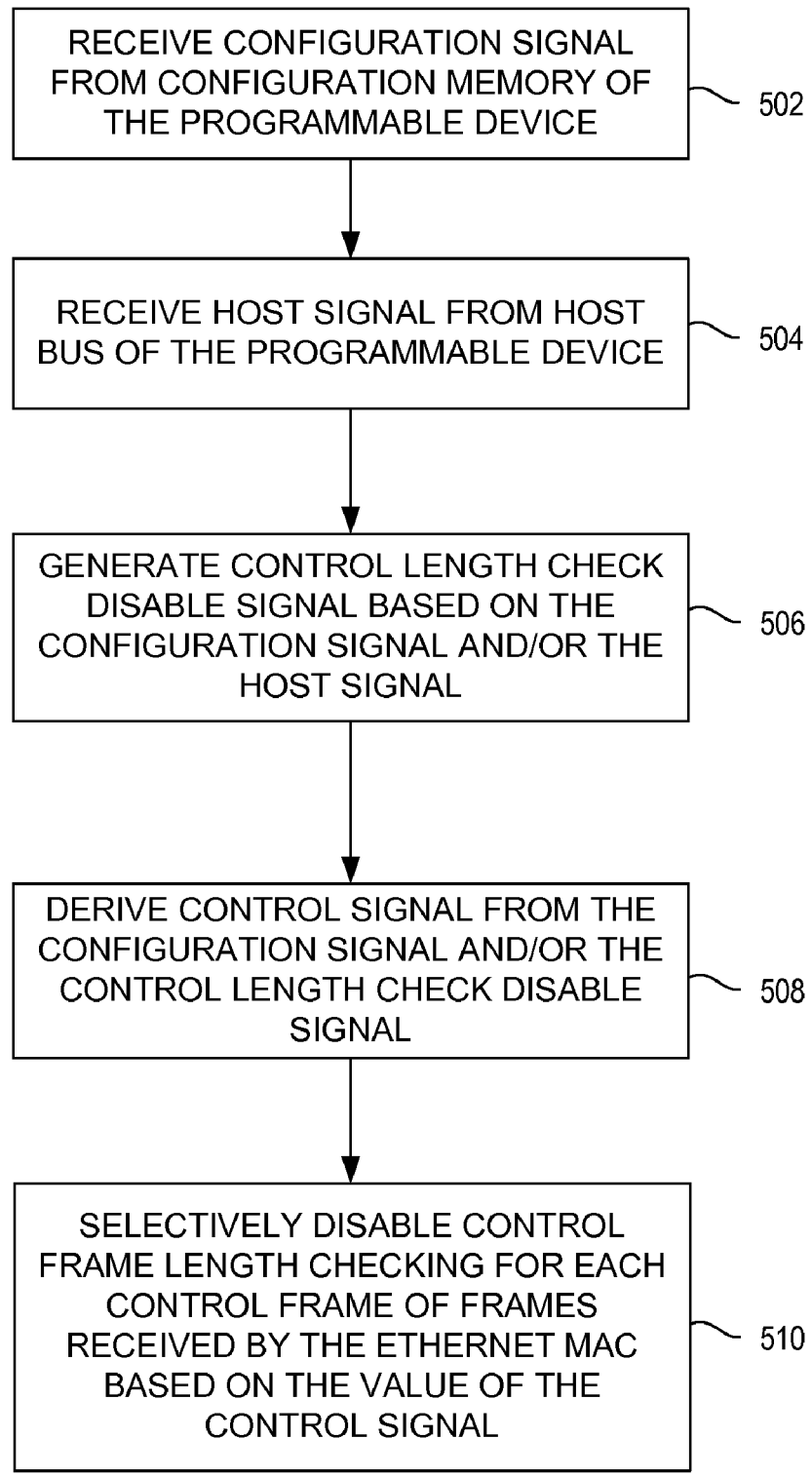
FIG. 5 is a flow diagram depicting an exemplary embodiment of a method for controlling an operating mode of an Ethernet MAC embedded in a programmable device according to some embodiments of the invention.

FIG. 5 is a flow diagram depicting an exemplary embodiment of a method 500 for controlling an operating mode of an Ethernet MAC embedded in a programmable device according to some embodiments of the invention. The method 500 can be performed using embodiments of the EMAC 150 described above. The method 500 begins at step 502, where a configuration signal is received from the configuration memory of the programmable device. At step 504, a host signal can be received from a host bus of the programmable device. At step 506, a control length check disable signal is generated the value of which depends on the value of the configuration signal and/or the host signal. At step 508, a control signal is derived from the configuration signal and/or the control length check disable signal. At step 510, control frame length checking is selectively disabled for each control frame of frames received by the Ethernet MAC based on the value of the control signal.

While the foregoing describes exemplary embodiments in accordance with one or more aspects of the present invention, other and further embodiments in accordance with the one or more aspects of the present invention may be devised without departing from the scope thereof, which is determined by the claims that follow and equivalents thereof. Claims listing steps do not imply any order of the steps. Trademarks are the property of their respective owners.

What is claimed is:

1. An apparatus for controlling an operating mode of an Ethernet media access controller (MAC) embedded in a programmable device, comprising:
   a configuration circuit configured to receive a configuration signal from configuration memory of the programmable device and a host signal from a host bus of the programmable device, and further configured to output a control length check disable signal the value of which depends on the value of at least one of the configuration signal and the host signal, wherein the configuration circuit comprises:
   a register configured to provide the control length check disable signal;
   a first multiplexer configured to select one of the host signal or the control length check disable signal as a first output signal in response to an enable signal of the Ethernet MAC; and
   a second multiplexer configured to select one of the configuration signal or the first output signal as an input to the register in response to a reset signal of the Ethernet MAC; and
   a parameter check circuit configured to receive a control signal derived from at least one of the control length check disable signal and the configuration signal, and further configured to selectively disable checking a length of each control frame in frames received by the Ethernet MAC based on a value of the control signal.

2. The apparatus of claim 1, wherein:
   the enable signal is a first value if the host signal includes valid data and a second value if the host signal does not include valid data; and
   the first multiplexer selects the host signal if the enable signal is the first value and selects the control length check disable signal if the enable signal is the second value.

3. The apparatus of claim 1, wherein:
   the reset signal is either asserted or not asserted; and
   the second multiplexer selects the configuration signal if the reset signal is asserted and selects the first output signal if the reset signal is not asserted.

4. The apparatus of claim 3, wherein the reset signal is a logical combination of a asynchronous reset signal coupled to the Ethernet MAC from the programmable device and a software reset signal derived from the host bus of the programmable device.

5. The apparatus of claim 4, wherein:
   the host check signal is a first value if the Ethernet MAC is coupled to a host controller on the host bus and a second value if the Ethernet MAC is not coupled to a host controller on the host bus; and
   the multiplexer selects the control length check disable signal if the host check signal is the first value and selects the configuration signal if the host check signal is the second value.

6. The apparatus of claim 1, further comprising:
   a multiplexer configured to select one of the configuration signal or the control length check disable signal as the control signal received by the parameter check circuit in response to a host check signal of the Ethernet MAC.

7. A method of controlling an operating mode of an Ethernet media access controller (MAC) embedded in a programmable device, comprising:
   receiving a configuration signal from configuration memory of the programmable device and a host signal from a host bus of the programmable device;
   generating a control length check disable signal the value of which depends on the value of at least one of the configuration signal and the host signal, wherein the generating a control length check disable signal comprises:
   storing a value for the control length check disable signal in a register;
   selecting one of the host signal or the control length check disable signal as a first output signal in response to an enable signal of the Ethernet MAC; and
   selecting one of the configuration signal or the first output signal as an input to the register in response to a reset signal of the Ethernet MAC;

deriving a control signal from at least one of the control length check disable signal and the configuration signal; and selectively disabling checking a length of each control frame in frames received by the Ethernet MAC based on a value of the control signal.

8. The method of claim 7, wherein:

the enable signal is a first value if the host signal includes valid data and a second value if the host signal does not include valid data; and the host signal is selected if the enable signal is the first value and the control length check disable signal is selected if the enable signal is the second value.

9. The method of claim 7, wherein:

the reset signal is either asserted or not asserted; and the configuration signal is selected if the reset signal is asserted and the first output signal is selected if the reset signal is not asserted.

10. The method of claim 9, wherein the reset signal is a logical combination of a asynchronous reset signal coupled to the Ethernet MAC from the programmable device and a software reset signal derived from the host bus of the programmable device.

11. The method of claim 7, wherein the deriving comprises:

selecting one of the configuration signal or the control length check disable signal as the control signal in response to a host check signal of the Ethernet MAC.

12. The method of claim 11, wherein:

the host check signal is a first value if the Ethernet MAC is coupled to a host controller on the host bus and a second value if the Ethernet MAC is not coupled to a host controller on the host bus; and the control length check disable signal is selected if the host check signal is the first value and the configuration signal is selected if the host check signal is the second value.

13. A programmable device, comprising:

an Ethernet media access controller (MAC) having a receive client interface for providing frames as output;

a receive client circuit, coupled to the receive client interface, for processing the frames;

a configuration memory having a storage location storing a value of a configuration signal coupled to the Ethernet media access controller;

a host controller coupled to a host bus that provides a host signal to the Ethernet media access controller;

a configuration circuit configured to receive the configuration signal and the host signal, and further configured to output a control length check disable signal the value of which depends on the value of at least one of the configuration signal or the host signal, wherein the configuration circuit comprises:

a register configured to provide the control length check disable signal;

a first multiplexer configured to select one of the host signal or the control length check disable signal as a first output signal in response to an enable signal of the Ethernet MAC; and a second multiplexer configured to select one of the configuration signal or the first output signal as an input to the register in response to a reset signal of the Ethernet MAC; and a parameter check circuit configured to receive a control signal derived from at least one of the control length check disable signal or the configuration signal and to provide a frame length error signal to the receive client circuit, and further configured to selectively disable checking a length of each control frame in the frames received by the Ethernet MAC based on a value of the control signal.

14. The programmable device of claim 13, wherein:

the enable signal is a first value if the host signal includes valid data and a second value if the host signal does not include valid data; and the first multiplexer selects the host signal if the enable signal is the first value and selects the control length check disable signal if the enable signal is the second value.

15. The programmable device of claim 13, wherein:

the reset signal is either asserted or not asserted; and the second multiplexer selects the configuration signal if the reset signal is asserted and selects the first output signal if the reset signal is not asserted.

16. The programmable device of claim 13, further comprising:

a multiplexer configured to select one of the configuration signal or the control length check disable signal as the control signal received by the parameter check circuit in response to a host check signal of the Ethernet MAC.

17. The programmable device of claim 16, wherein:

the host check signal is a first value if the Ethernet MAC is coupled to the host controller on the host bus and a second value if the Ethernet MAC is not coupled to the host controller on the host bus; and the multiplexer selects the control length check disable signal if the host check signal is the first value and selects the configuration signal if the host check signal is the second value.

* * * * *